Feb. 28, 1961

D. MELNICK 2,973,269

METHOD OF MAKING MARGARINE

Filed March 16, 1959

INVENTOR.
DANIEL MELNICK
BY
Kenyon & Kenyon
ATTORNEYS

Feb. 28, 1961  D. MELNICK  2,973,269
METHOD OF MAKING MARGARINE
Filed March 16, 1959  6 Sheets-Sheet 5

Fig. 5.

INVENTOR.
DANIEL MELNICK
BY
Kenyon & Kenyon
ATTORNEYS

Feb. 28, 1961   D. MELNICK   2,973,269
METHOD OF MAKING MARGARINE
Filed March 16, 1959   6 Sheets-Sheet 6

INVENTOR.
DANIEL MELNICK
BY
Kenyon & Kenyon
ATTORNEYS 2,973,269
Patented Feb. 28, 1961

2,973,269

METHOD OF MAKING MARGARINE

Daniel Melnick, Teaneck, N.J., assignor to Corn Products Company, a corporation of Delaware Filed Mar. 16, 1959, Ser. No. 799,712

13 Claims. (Cl. 99—122)

The present invention relates to a process of making margarine of exceptional appearance, flavor, stability and other functional qualities.

This application is a continuation-in-part of Serial No. 658,011, filed May 9, 1957, which in turn is a continuation-in-part of Serial No. 356,319, filed May 20, 1953 (now abandoned).

In the conventional manufacture of margarine, a liquid mixture of fat and skim milk is subjected to cooling and working in Votators or similar equipment. The product of the Votators is allowed to solidify for a period of time during which the titer heat due to fat crystallization is almost completely dissipated. The set-up product is then mechanically formed into prints in the course of which the solid product is worked. The form of the final prints is obtained by forcing the solid mass of the worked margarine through an orifice of desired cross-section and then cutting the propelled mass to proper length. In all the steps of the operation following solidification of the margarine product, the margarine in its set-up form is worked to only a limited degree so that a firm print would still be obtainable.

The conventional unwhipped margarine product which has been worked in the solid state after the titer heat has been dissipated shows marked inferior characteristics because of nonuniformity in texture (mixture of soft and hard margarine within the same print), undesirable porosity (air pockets), and poor stripping from the wrapper (cohesive forces within the print not adequate to overcome adhesion to the wrapper). All of these objectionable characteristics are substantially reduced by producing margarine by the method of the present invention.

In contrast to conventional products, the unwhipped margarine products of the present invention are initially uniform and smooth in texture and hence require no tempering. Margarine made by the conventional process which involves molding margarine already set up, is beady in character comprising hard margarine dispersed in very soft (worked) margarine. Only by tempering for about 48 hours at room temperature and then rechilling can the beady character of the conventional margarine be eliminated. This tempering step has an inherent disadvantage over and above contributing to manufacturing costs. The crystallized fat in rechilled margarine undergoes polymorphic changes until the stable crystalline form is obtained. This form melts at an appreciably higher melting point with the result that tempered margarine melts noticeably less readily in the mouth. As a result of continuous refrigeration storage, possibly only with the margarines of the present invention, is it possible to retain the quick-melt-in-the-mouth feature of the freshly-produced product. The unwhipped margarines of the present invention are also free of gross air pockets and this is reflected by specific gravity measurements. These novel margarines have a specific gravity equal to that of the liquid margarine emulsion, viz., 0.96 in the case of the product made with 2.5% salt present, whereas conventional margarine of the prior art made from a similar liquid margarine emulsion has a measurably lower specific gravity of about 0.89 to 0.92. Gross air pockets are undesirable since they contribute to the flavor instability of the margarine, provide conditions conducive to microbiological spoilage, and are responsible for fracturing of the margarine when patties are cut. Since the margarines of the present invention set up within the container from liquid to solid form, strong cohesive forces develop within the final solid product. This is in contrast to that noted with conventional margarines already set up prior to molding. The conventional product depends upon pressure during the molding of the solid margarine pieces to hold these solid pieces together following molding. As a result, the adhesive forces responsible for margarine sticking to the wrapper often exceed cohesive forces within the print, so that after removal of the wrapper, pieces of conventional margarines will be sticking to the wrapper and the margarines will have a pocked surface appearance. The margarines of the present invention, on the other hand, strip clean from the wrapper, leaving a smooth uniform surface on the print. This factor of strong cohesive force within the margarines of the present invention also contribute to the ease with which patties can be cut without fracturing.

The surprising body of the margarine of the present invention at 70 to 80° F. associated with greater resistance to "oiling off" than conventional margarine at these temperatures, is attributed by me to the fact that the novel products of the present invention are molded as a superchilled, worked, liquid fill in the form of a flowable gel or mass. This is an important feature of the process of my invention which will be described below. It is my belief that when a superchilled, worked, liquid-margarine emulsion is packed as a liquid fill, stearine structure sets up as a continuous phase throughout the product. This skeletal stearine structure holds the products together at the elevated temperatures (70 to 80° F.) during subsequent storage. In making conventional margarine the stearine structure is disrupted as a result of the work imparted to the set-up product before packaging. Conventionl margarine, therefore, requires a relatively firm fat with a sacrifice in spreadability in the cold and in mouthing properties. In the case of a whipped margarine product prepared by the same conventional process as is used in making whipped butter, stearine structure is almost completely disrupted; consequently, the body characteristics of such margarine at room temperature are even less satisfactory, unless a firm margarine oil of relatively high melting point, viz., above 100° F., is employed, but then with a sacrifice in "mounting" characteristics.

Thus, an object of this invention is to provide a process for making margarine whereby the end product has exceptional appearance, flavor, stability and other functional properties.

Another object of this invention is to provide a process for making exceptional margarine, whether the end product is whipped or unwhipped.

The present invention is concerned with the process comprising superchilling a liquid margarine to a temperature of about 15° to 40° F. below the setting point of the fat ingredient thereof, working the superchilled liquid margarine to dissipate at least about 20%, preferably at least about 30%, of the potential titer heat due to fat crystallization but maintaining the same as a flowable mass, solidifying the flowable mass, packaging the margarine, and said process being operated such that no work is imparted to the margarine following solidification, and the fat ingredient has a melting point of about 90° to 100° F., a setting point of about 70° to 80° F. and an iodine value of about 70 to 90. The expression "flowable" in this specification encompasses the term "pumpable" in referring to the superchilled mass before it is allowed to set up.

For the purpose of this invention, the potential titer heat is defined as the temperature differential between the setting point of the fat and the lowest superchilled temperature obtained for the liquid margarine. The percentage of potential titer heat dissipated due to fat crystallization during the process of this invention, is defined as the temperature differential between the setting point of the fat and final product temperature divided by the potential titer heat.

According to Government regulations, margarine is produced by combining a milk phase with not less than 80% by weight of fat. Usually skim milk in quantity of about 15 to 20% by weight is present; and the fat usually of vegetable origin varies generally from about 80 to 82%. Common salt or sodium chloride may or may not be added; when added to margarine, it is usually in an amount of up to 4%. Other optional ingredients include vitamins A and D, coloring matter, emulsifiers, preservatives and flavoring agents. The inclusion of a gas in the product in the processes involved in preparing the whipped margarines of this invention is also permitted since the ingredient composition is expressed in terms of percent by weight of the margarine. It will be recognized that margarine composition can be varied considerably for commercial purposes just so long as the final product is solid at room temperature (70° to 80° F.) and possesses the desired organoleptic qualities. The improvement in the products of the present invention over those made according to conventional techniques exist irrespective of the variations and formulations indicated above. Indeed, the improvements noted are also obtainable with margarines falling outside the Government specification, viz., a margarine containing water in place of the skim milk.

The fat employed in the manufacture of my margarines has a Wiley melting point of about 90° to 100° F., and more usually about 92° to 98° F. The setting point of the fat is about 70° to 80° F. and more usually 72° to 77° F.; the setting point is determined by the method described in U.S. Patent No. 2,047,530. In general, the fat has an iodine value (Wijs) of about 70 to 90 and more usually about 75 to 85. The fat is derived from the hydrogenation of one or more vegetable oils. In this connection the vegetable oil may be cottonseed oil, soyabean oil, corn oil and any other which meets the specifications mentioned herein. Such vegetable oils in a natural state are limpid and consequently hydrogenation is necessary to change them to fats for use in margarine. The margarine fat may consist of two or more hydrogenated ingredients rather than a single component. In this connection it is usual to combine a highly hydrogenated solid fat with a lightly hydrogenated fat in order to extend the plasticity range of margarine (more spreadable in the cold and still resistant to melting at room temperature). In my Canadian Patent No. 560,273 are listed 13 examples of suitable fat components for use in the processes to be described herein and such disclosures are incorporated herein by reference.

In the manufacture of margarine under my invention, the starting liquid emulsion or margarine is formed by mixing the aqueous phase with fat phase, the latter at a temperature of about 100° to 130° F., preferably about 10° to 20° F. above the melting point of the fat ingredient, or usually at about 110° to 120° F. The emulsion is mixed thoroughly by suitable means and fed to a superchilling zone in accordance with the practice of this invention. The temperature at which the emulsion is fed to the superchilling zone is about 95° to 115° F.

The superchilling zone may be the A-unit of a conventional Votator. It is desirable to superchill the margarine to a temperature of about 15° to 40° F., preferably about 20° to 35° F., below the setting point of the fat ingredient, and for this purpose, one or more A-unit cylinders may be employed. The number of A-unit cylinders employed in series, or the use of B-unit cylinders or working units therewith, has an effect on the percent of potential titer heat dissipated before packaging the flowable mass or gel. In the course of imparting this work to the superchilled mass, fat crystallization occurs, which in turn is responsible for dissipation of titer heat from the product while it is still a flowable mass or gel.

At present, one of the more popular conventional Votators is designed to provide a capacity for holding at any given time about four to seven pounds of liquid margarine, whether or not aerated, in each chilling A-unit cylinder, but the through-put rate may vary to chill about 4000 to 7000 pounds of margarine emulsion per hour. In propelling the emulsion to the A-units of the Votator, a pressure of about 200 to 400 p.s.i.g. is maintained and the same pressure range applies to product being fed to the working B-units. Various combinations of units are possible within the scope of the present invention just so long as at least 20% of the potential titer heat is dissipated in the process. In the case of a series of three A-unit cylinders, generally about 5 to 30% of the potential titer heat is dissipated in the units per se, whereas if a working B-unit cylinder, capable of holding about 90–160 pounds of liquid margarine, whether aerated or not, were used in place of the intermediate chilling A-unit cylinder, about 30 to 90% of the potential titer heat would be dissipated. If three A-unit cylinders are employed, followed by a B-unit cylinder, about 20 to 40% of the potential titer heat would be dissipated, whereas two series of three A-unit cylinders would dissipate about 10 to 60% of the potential titer heat. The foregoing examples are based upon through-put rates of 4000 to 7000 pounds per hour. In the absence of the working B-unit, it is necessary to increase the number of chilling A-unit cylinders and/or decrease through-put rate to attain the required dissipation of at least about 20% of the potential titer heat during the process. Other processing variations are possible, but in the overall, it should be apparent that at least about 20% and up to 90% of the potential titer heat is dissipated in the superchilling and working of the liquid margarine, and the superchilled margarine is maintained as a flowable mass or gel prior to being packaged. My process distinguishes clearly from conventional practice in that the liquid margarine is never allowed to set up or solidify to the degree that it is not flowable or pumpable at any time prior to molding to provide a print. "Print" in this specification means solid margarine units of convenient size for table use.

To provide a better understanding of the conditions which may prevail in the Votator, the liquid margarine leaving the first A-unit may have a temperature of about 35° to 63° F., or more usually about 40° to 60° F. Following the chilling A-unit, the margarine may enter a working B-unit and subsequent holding unit (hopper or molder) in which an overall temperature rise of about 6° to 30° F. may occur, and therefore the margarine may leave the B-unit and subsequent holding unit at a temperature of about 50° to 73° F., preferably about 55° to 72° F. The margarine as a flowable mass is maintained in both the A-unit and B-unit of the Votator under a pressure of about 200 to 400 p.s.i.g. The margarine product obtained by this two-step process may be allowed to set up at atmospheric pressure in the container or wrapper prior to being handled. Little titer heat rise occurs in the package in this operation. When the container has structural strength like a cardboard or plastic tub, it is more readily handled. In the case of spout filling of mold cavities lined with a wrapper, it is preferred to pass the flowable mass through a chilling or cooling compartment which is maintained at a temperature of 45° F. or less. At this temperature, the print becomes sufficiently case hardened to be packaged with less chance of damage. Another technique by which this margarine can be packaged is to pass the workable mass, at a temperature in the lower range of that indicated in the working zone, through an orifice having the desired cross-section of a print, chilling the extruded solid product to obtain case hardening, cutting the extruded product to proper length, wrapping and then cartoning. All margarines are refrigerated after packaging.

As previously indicated, the benefits of the invention are obtained whether the margarine is whipped or unwhipped. However, in making the whipped products of the present invention, the same two-step process as described above is used with the exception that (a) the liquid margarine emulsion is admixed with the inert gas prior to the first chilling operation, the inert gas being introduced in an amount sufficient to provide a finished composition containing about 15 to 40% gas by volume, and (b) pressure on the product may not be greater than 200 p.s.i.g., more usually not greater than about 150 p.s.i.g. and preferably about 60 to 120 p.s.i.g. In making the whipped product, the pressure imposed on the flowable mass is released to atmospheric level prior to solidification in the mold. By doing this, the inert gas expands uniformly in the flowable mass and thus a uniform and homogeneous molded product is obtained following solidification.

It was found that preparing margarine by use of a temperature significantly above 73° F. during the working step of the two-step process results in a product which is significantly inferior to the product of this invention. When such margarine sets up, it exhibits a coarse grainy texture and globules of free milk and is unsuitable for the purpose of this invention. Product temperature of the whipped and unwhipped margarines of the present invention during the working step of the two-step process is about 50° to 73° F., preferably 55° to 72° F.

In the preferred three-step process of the present invention (chilling A-unit+working B-unit+chilling A-unit), the flowable mass being discharged from the working B-unit is subjected to additional chilling and working. During this third step additional fat crystallization is effected. The work imparted to the product at this stage, however, disrupts stearine structure as it is formed so that a flowable mass is still obtained. The product produced by the third step sets up in a matter of seconds and for this reason the product lends itself to continuous filling of a molding zone having the same cross-sectional area as the final print for solidification or for continuous filling of mold cavities of the size of the final print. In this preferred three-step process, dissipation of part of the titer heat during the last phase of fat crystallization is allowed to take place in the product during molding as a flowable mass and during subsequent packaging.

In the three-step process, the flowable mass discharged from the intermediate B-unit is at a temperature of about 50° to 65° F., having exhibited a titer heat rise of about 2° to 15° F. It is again chilled to a temperature of about 15° to 40° F., and preferably about 20° to 35° F., below the setting point of the fat. This provides a superchilled and worked flowable mass of margarine at a temperature of about 35° to 63° F. and more usually about 40° to 55° F. After leaving the second A-unit, the subsequent and second titer heat rise amounts to 1° to 15° F., so that the final set-up product has a temperature of about 43° to 65° F., and usually about 48° to 58° F. Part of this titer heat is dissipated during the period the product sets up in the molding zone, and the remainder after the product is packaged. Thus, the total of temperature rises due to dissipation of titer heat is about 6° to 30° F. in this three-step process. These operating temperatures apply in the production of both the whipped and unwhipped margarines of this invention. Pressure on the product in making the unwhipped margarine is usually in the range of 200 to 400 p.s.i.g., falling off to as low as 20 p.s.i.g., during solidification in the molding zone. In preparing the whipped margarine, the pressure of the third step is maintained at about 1 to 300 p.s.i.g., and preferably about 1 to 100 p.s.i.g. Furthermore, the pressure on the whipped flowable mass after the third step is brought to atmospheric level prior to being solidified in the mold or package. The whipped product is passed from a spout to rigid containers of proper cross-sectional area or into mold cavities of proper cross-sectional area and lined with the wrapper, with concomitant pressure release. The margarines are usually refrigerated after packaging.

The working B-unit holds a considerably greater quantity of margarine than the A-unit, viz., about 160 pounds in comparison to 7 pounds, with through-put rate being about 4000 to 7000 pounds per hour. Single or multiple B-units of different capacities may be used with single or multiple A-units of different capacities provided the through-put rate is such as to obtain the desired degrees of superchilling and subsequent titer heat rise. Indeed, it is even possible to use three or more A-unit cylinders in the three-step process, eliminating refrigeration from one or more of the intermediate cylinders so that each intermediate cylinder would then act as a working B-unit of reduced capacity. Three or more A-units, all with refrigeration applied, may likewise be used, provided superchilling in one or more of the cylinders lowers the temperature of the flowable mass to about 15° to 40° F. and preferably about 20° to 35° F. below the setting point of the fat and subsequent titer heat dissipation raises the measurable temperature of the product by about 6° to 30° F. as the flowable mass is allowed to set in a molding zone and subsequently packaged. I recognize that a series of A-units with subsequent metering cylinders and molding zones do more than simply chill the liquid margarine emulsion; the superchilled flowable mass is worked as well as chilled in the equipment which follows the initial chilling operation, even though titer heat effects in subsequent A-units are masked by the simultaneous chilling. When superchilled margarine emulsion is packaged directly into a container without being worked, viz., directly after the first chilling operation of the A-unit with a high through-put rate, the final solid product exhibits an objectionable firmness and brittleness which cannot be corrected even by tempering, because the percent of potential titer heat dissipated during the over-all process is less than 20%. The unworked superchilled margarine emulsion shows a maximal titer heat rise, almost to the setting point of the fat, due to fat crystallization as it sets up in the container.

To provide a better understanding of my invention, reference will be had to the accompanying drawings which form a part of this invention and wherein.

Figure 1:
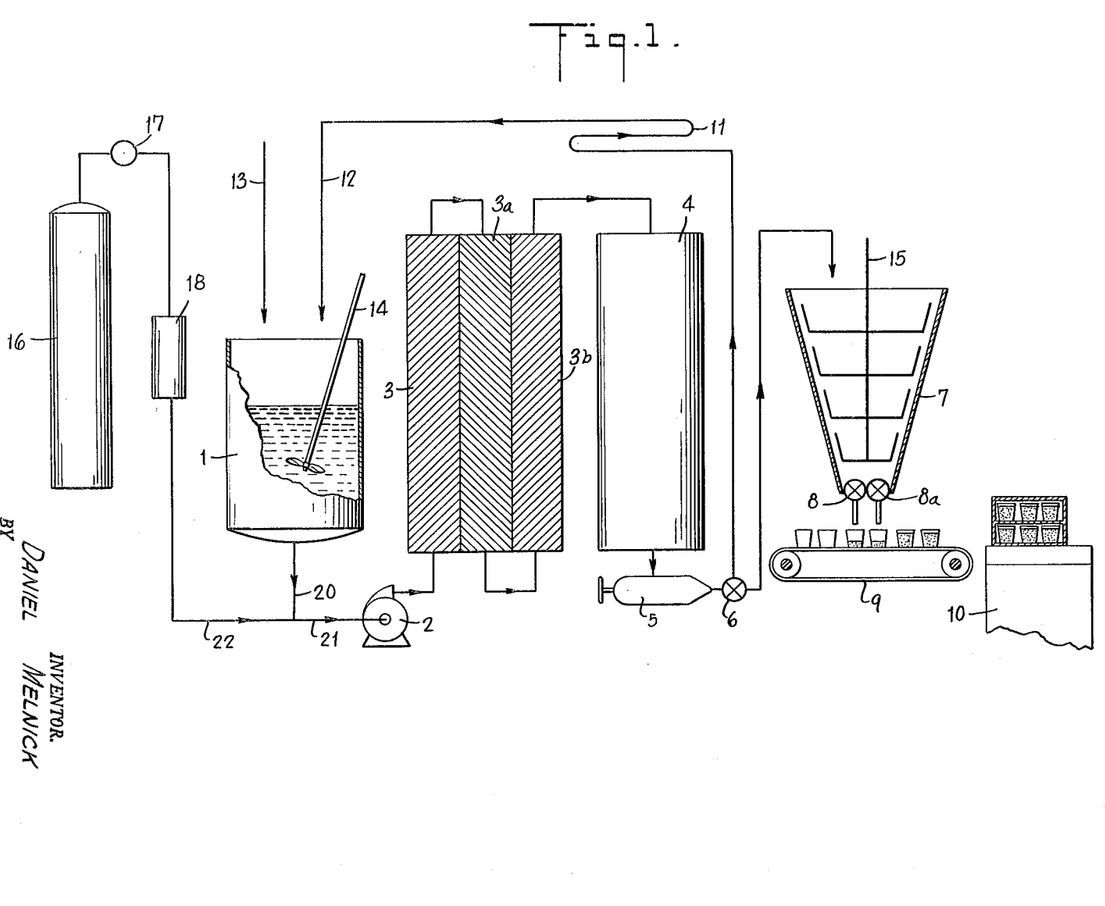
Figure 1 is a specific example of an operation employing three chilling A-unit cylinders and a working B-unit cylinder to produce whipped margarine.

Referring to Figure 1, 80.4 parts by weight of margarine fat having a melting point of 94.0° F., a setting point of 74.8° F. and an iodine value of 78.8 are combined with 17.6 parts by weight of skim milk and 2.0 parts by weight of sodium chloride. The fat consists of 60 parts of soyabean oil selectively hydrogenated to an iodine value of 74.9 and 40 parts of cottonseed oil selectively hydrogenated to an iodine value of 85.0 and contains the customary vitamins, emulsifiers and preservatives. This mixture of fat and milk is fed from a supply line 13 to a churn 1 in which is positioned a stirrer 14 for the purpose of obtaining homogeneous mixing. Recycled, remelted margarine is also fed to churn 1 by means of a return line 12. The temperature of the margarine emulsion in churn 1 is maintained at about 100° to 105° F. The liquid margarine is discharged from the bottom of the churn through a line 20 entering the suction line 21 of a pump 2. Nitrogen gas is fed into line 21 by means of line 22 in such quantity as to provide a final product containing 23% by volume of added nitrogen. The nitrogen is supplied from a cylinder 16. The rate of introduction of the nitrogen gas from cylinder 16 is controlled by means of a suitable valve 17 and a gas-flow meter 18. The concentration of the nitrogen gas is controlled by periodic measurements of the specific volume of the end product before it is allowed to set up.

The aerated liquid margarine is propelled by pump 2 through a series of three chilling A-unit cylinders 3, 3a and 3b. The flowable mass then enters the working B-unit cylinder 4 and then passes through an extrusion valve 5 adjusted to maintain a pressure at this point of 80 p.s.i.g. The residence time in each A-unit cylinder is about 4 seconds while that in the working B-unit cylinder is about 96 seconds with a through-put rate being about 5000 pounds per hour. The superchilled liquid margarine product leaving the series of A-unit cylinders is at a temperature of about 59° F. and following the working B-unit cylinder 4 is at a temperature of about 70° F., the increase in temperature being due to dissipation of titer heat resulting from fat crystallization. The margarine as a flowable mass then passes through a two-way valve 6 into a hopper 7, where it is slowly mixed at atmospheric pressure by a stirrer 15 until it is passed into consumer-size tubs through alternating valves 8 and 8a operating in conjunction with metering systems, each comprising a piston-cylinder combination.

There is no significant titer heat rise in the aerated margarine as it sets up as a solid print in the mold cavity which in this case is the container itself. The covered tubs containing the aerated whipped margarine are carried by a conveyor system 9 to a packaging table 10 where transfer to shipping cases is made. The aerated whipped margarine is allowed to solidify in its container by cooling or even by allowing it to remain in its container at room temperature. Referring to the two-way valve 6, it will be noted that another line extends from it back to churn 1. This line provides recycling of excess margarine, the excess being produced to assure at all times sufficient output for molding and packaging. The excess aerated flowable mass is recycled through a heat exchanger 11 before entering churn 1 through line 12. In the heat exchanger the temperature is raised to about 100° F. thus assuring complete liquefaction of the returned margarine. In the process described, about 31% of the potential titer heat of the superchilled liquid margarine is dissipated.

Figure 2:
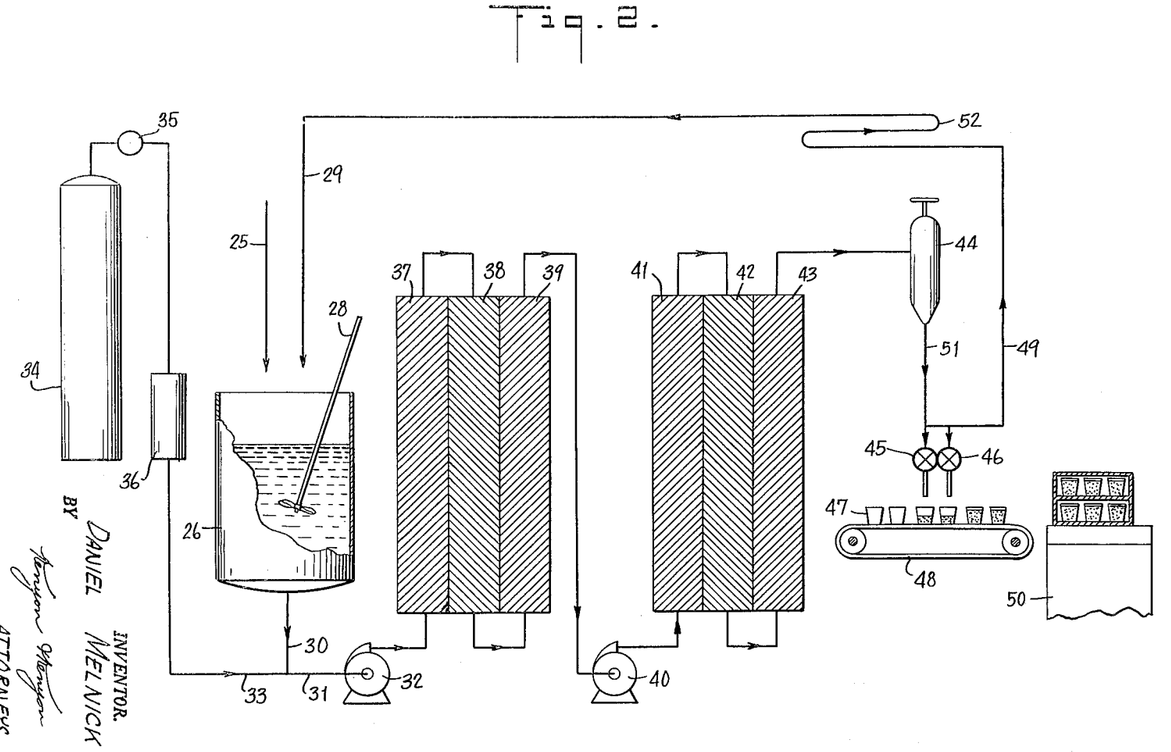
Figure 2 is a specific example of a whipped margarine production in which two series each of three A-unit cylinders are employed.

Referring to Figure 2, 80.4 parts by weight of margarine fat having a melting point of 98.1° F., a setting point of 72.8° F. and an iodine value of 83.4 and having dissolved therein the customary vitamins, emulsifiers and preservatives are added 17.6 parts by weight of flavored skim milk and 2.0 parts by weight of sodium chloride. The fat consists of 98 parts of cottonseed oil selectively hydrogenated to an iodine value of 85 and 2 parts of cottonseed oil selectively hydrogenated to an iodine value of 5.0. This mixture of fat and milk is fed from a supply line 25 to a churn 26 in which is positioned a stirrer 28 for the purpose of obtaining homogeneous mixing. Recycled, remelted margarine is also fed to churn 26 by means of a return line 29. The temperature of the margarine emulsion in churn 26 is maintained at about 105–110° F. The liquid margarine is discharged from the bottom of the churn through a line 30 entering the suction line 31 of a pump 32. Nitrogen gas is fed from a line 33 in such quantity as to provide a final product containing 33% by volume of added nitrogen. The nitrogen gas is supplied from a cylinder 34. The rate of introduction of nitrogen gas from cylinder 34 is controlled by a suitable valve 35, and a gas-flow meter 36. The concentration of the nitrogen gas is controlled by periodic measurements of the specific volume of the end product before it is allowed to set up.

The aerated liquid margarine is propelled by pump 32 through a series of three chilling A-unit cylinders 37, 38 and 39, and then through a booster pump 40 before entering another series of three chilling A-unit cylinders 41, 42 and 43. The flowable mass then passes through an extrusion valve 44 which is adjusted to maintain a pressure at this point of 60 p.s.i.g. The residence time in each A-unit cylinder is about 4 seconds with a through-put rate of about 4000 pounds per hour.

The superchilled liquid margarine product leaving the first series of A-unit cylinders 37, 38 and 39 is at a temperature of about 59° F. and after passage through the second series of chilling A-unit cylinders 41, 42 and 43 is at a temperature of about 40° F. During this operation the flowable mass is not only being chilled but is also being worked as well. The margarine, still as a flowable mass, then passes through alternating valves 45 and 46 operating in conjunction with metering systems (not shown). There is an overall titer heat rise of about 20° F. as the aerated flowable mass leaves the chilling A-unit cylinders and sets up at atmospheric pressure as a solid print in the mold cavity which in this case is the container itself, the consumer-size tub 47. The titer heat rise resulting from fat crystallization is responsible for the final product temperature increasing to 60° F. The covered tubs 47 containing the aerated whipped margarine are carried by a conveyor system 48 to a packaging table 50 where transfer to shipping cases is made. Referring to the line 51 leaving the extrusion valve 44, it will be noted that this branches into another line 49 which becomes the return line. This supplementary line provides feeding of an excess quantity of the flowable mass to the packaging unit, the excess flowable margarine being produced to assure at all times sufficient out-put for molding and packaging. The excess aerated flowable mass is recycled through a heat exchanger 52 before entering churn 26 through line 29. In the heat exchanger the temperature is raised to about 105° F. thus assuring complete liquefaction of the returned margarine. In the process described, about 39% of the potential titer heat of the superchilled liquid margarine is dissipated.

Figure 3:
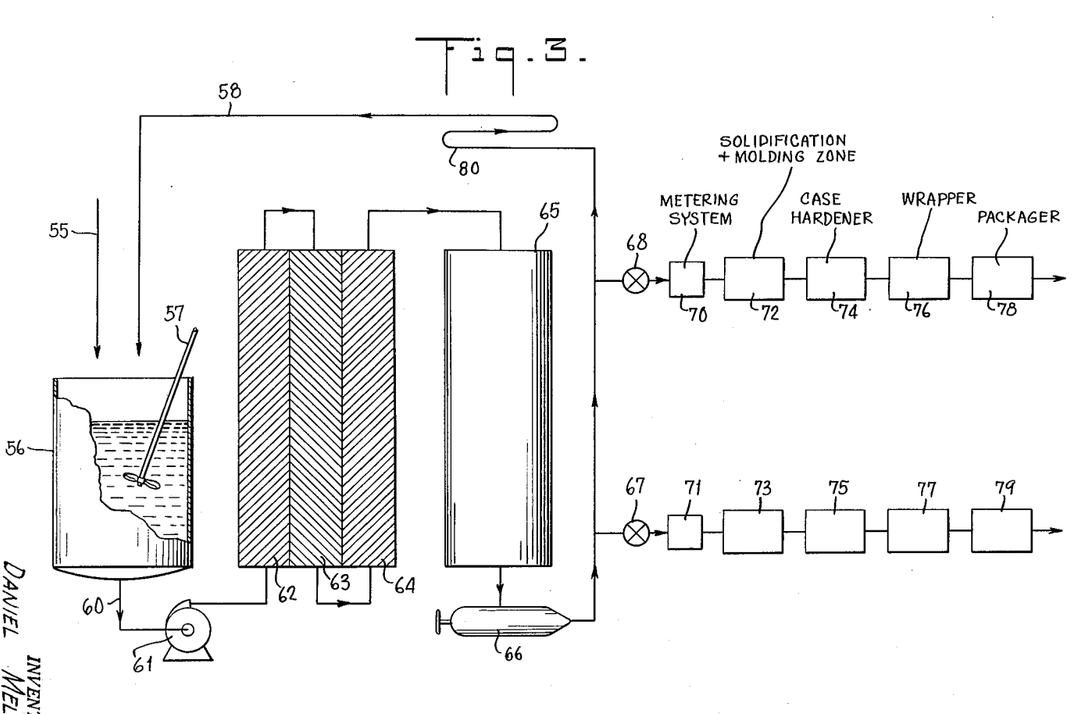
Figure 3 is a specific example of an unwhipped margarine production in which three A-unit cylinders are employed with a working B-unit cylinder.

Referring to Figure 3, 80.4 parts by weight of margarine fat having a melting point of 94.4° F., a setting point of 75.2° F. and an iodine value of 77.0 and having dissolved therein the customary vitamins, emulsifiers and preservatives, are combined with 17.0 parts by weight of flavored skim milk and 2.6 parts by weight of sodium chloride. The fat consists of 90 parts of regular margarine oil (50:50 soyabean and cottonseed oil) selectively hydrogenated to an iodine value of 74.9 and 10 parts of limpid peanut oil of 93 iodine value. This mixture of fat and milk is fed from a supply line 55 to a churn 56 in which is positioned a stirrer 57 for the purpose of obtaining homogeneous mixing. Recycled, remelted margarine is also fed to churn 56 by means of a return line 58. The temperature of the margarine emulsion in churn 56 is maintained at about 100 to 105° F. The liquid margarine is discharged from the bottom of the churn through a line 60 entering the suction side of a pump 61 and then propelled through a series of three chilling A-unit cylinders 62, 63 and 64. The flowable mass then enters the working B-unit cylinder 65 and then passes through an extrusion valve 66 which maintains a pressure at this point of 300 p.s.i.g. The residence time in each A-unit cylinder is about 4 seconds while that in the working B-unit cylinder is about 96 seconds with a through-put rate of about 6000 pounds per hour. The superchilled liquid margarine product leaving the series of A-unit cylinders is at a temperature of about 40° F. and following the working B-unit cylinder is at a temperature of about 53° F., the increase in temperature being due to dissipation of titer heat resulting from fat crystallization.

The margarine, as a flowable mass, then passes through alternating valves 67 and 68 operating in conjunction with metering systems 70 and 71 each comprising a piston-cylinder combination. Each discharge of the metering unit propels the equivalent of one print of final product into a solidification and molding zone 72 or 73 having the same transverse cross-sectional area as that of the final print. The solidified (semi-solid) margarine is case-hardened in a chiller 74 or 75. The chilled continuous print of margarine is then cut to proper length and then wrapped by suitable means shown as 76 or 77. The wrapped print is then cartoned in units 78 or 79. Referring to the line feeding the alternating valves 67 and 68, it will be noted that this leads back to churn 56. This line provides recycling of excess margarine, the excess being produced to assure at all times sufficient output for molding and packaging. The excess flowable mass is recycled through a heat exchanger 80 before entering churn 56 through line 58. In the heat exchanger the temperature is raised to about 100° F. thus assuring complete liquefaction of the returned margarine. Final product temperature in this operation averages about 55° F., with a 6° F. temperature differential between the outer case-hardened surface and the inner core of the print. In the process described, about 58% of the potential titer heat of the superchilled liquid margarine is dissipated.

Figure 4:
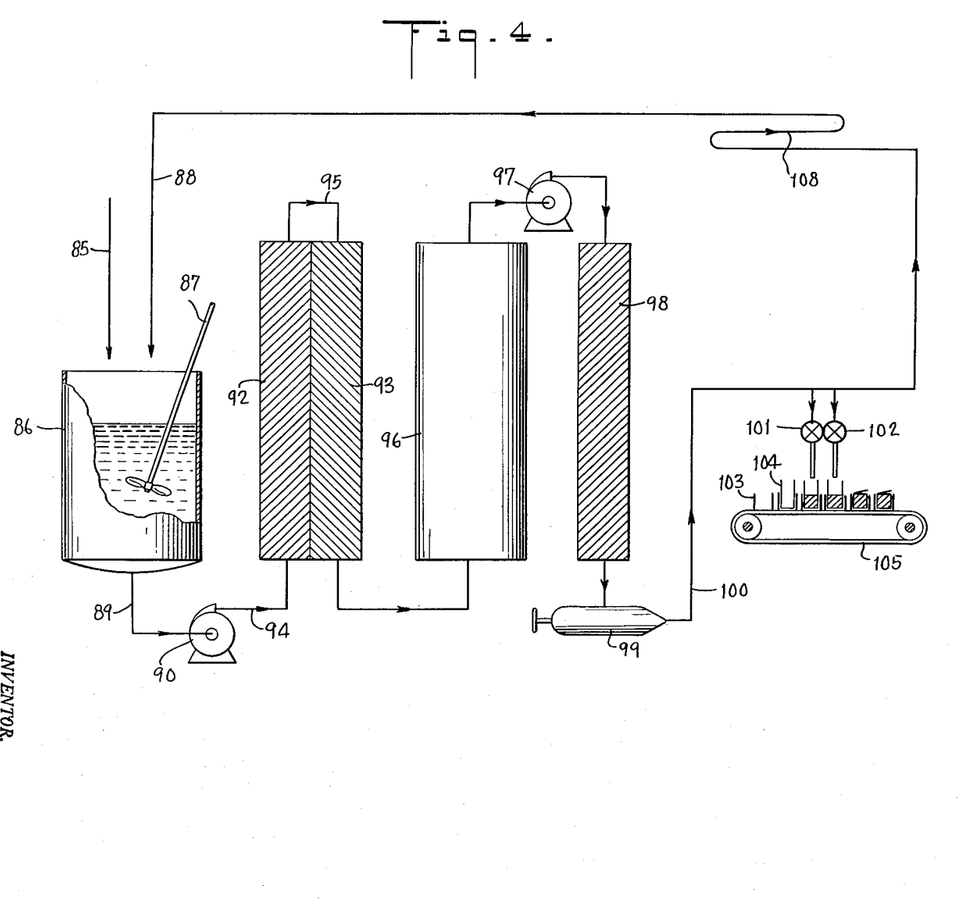
Figure 4 is an example of an unwhipped margarine in which three A-unit cylinders are used with a working B-unit cylinder intermediate of the second and third A-unit cylinder.

Referring to Figure 4, 80.4 parts by weight of margarine fat having a melting point of 95.4° F., a setting point of 76.5° F. and an iodine value of 76.1 and having dissolved therein the customary vitamins, emulsifiers and preservatives are combined with 17.0 parts by weight of flavored skim milk and 2.6 parts by weight of sodium chloride. The fat consists of 95 parts of regular margarine oil (50:50 soyabean and cottonseed oil) selectively hydrogenated to an iodine value of 74.9 and 5 parts of limpid peanut oil of 93 iodine value. This mixture of fat and milk is fed from a supply line 85 to a churn 86 in which is positioned a stirrer 87 for the purpose of obtaining homogeneous mixing. Recycled, remelted margarine is also fed to churn 86 by means of a return line 88. The temperature of the margarine emulsion in churn 86 is maintained at about 100° to 105° F. The liquid margarine is discharged from the bottom of the churn 86 through a line 89 which joins a pump 90 and is thereby propelled through two chilling A-unit cylinders 92 and 93 by means of lines 94 and 95. Next, the margarine flows to a working B-unit cylinder 96, then through a booster pump 97 into a single chilling A-unit 98 and finally through an extrusion valve 99. The valve is adjusted to maintain a pressure at this point of 200 p.s.i.g. The residence time in each A-unit cylinder is about 4 seconds while that in the working B-unit cylinder is about 96 seconds with a through-put rate of about 6000 pounds per hour. The superchilled liquid margarine product leaving the A-unit cylinder 93 is at a temperature of about 50° F., at about 56° F. leaving the working B-unit cylinder 4 and at about 48° F. leaving the chilling A-unit cylinder 98.

The margarine, as a flowable mass, passes through the extrusion valve 99 into a line 100, and is thereafter passed in predetermined quantities through alternating valves 101 and 102 which operate in conjunction with metering systems (not shown), each comprising a piston-cylinder combination. The valves feed the flowable mass into mold cavities 103, each of which is lined with a wrapper 104. The margarine in the wrapper solidifies within a matter of seconds, or soon enough so that it can be handled without damage, e.g. being ejected from the conveyor 105 and then placed in a carton (not shown). At this point the final product temperature is about 53° F., the second rise in temperature being due to further dissipation of the titer heat resulting from fat crystallization occurring in the wrapped product. Referring to line 100, it will be noted that a portion of margarine flows back to the churn 86, but before doing so, it is reheated by an exchanger 108. In the heat exchanger the temperature is raised to about 100° F. thus assuring complete liquefaction of the returned margarine, the excess being recycled to assure at all times sufficient out-put for molding and packaging. In the process described, about 82% of the potential titer heat of the super-chilled liquid margarine is dissipated.

Figure 5:
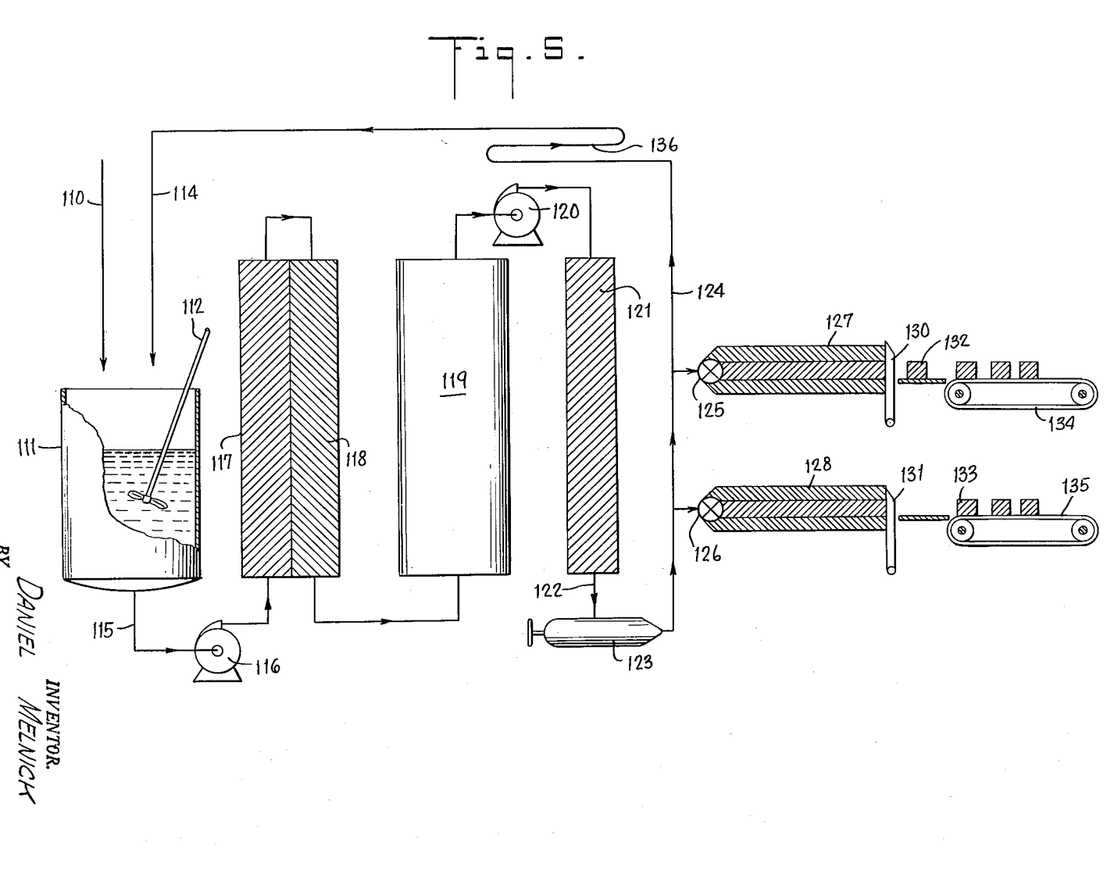
Figure 5 is similar to Figure 4 except that a different method of molding and packaging is employed.

Referring to Figure 5, 80.4 parts by weight of margarine having a melting point of 93.4° F., a setting point of 74.0° F. and an iodine value of 85.5 and having dissolved therein the customary vitamins, emulsifiers and preservatives are combined with 17.6 parts by weight of flavored skim milk and 2.0 parts by weight of sodium chloride. The fat consists of 23 parts of soyabean oil selectively hydrogenated to an iodine value of 67.4, 37 parts of soyabean oil selectively hydrogenated to an iodine value of 92.8 and 40 parts of cottonseed oil selectively hydrogenated to an iodine value of 89.0. This mixture of fats and milk is fed from a supply line 110 to a churn 111 in which is positioned a stirrer 112 for the purpose of obtaining homogeneous mixing. Recycled margarine is also fed to churn 111 by means of a recycle line 114. The temperature of the margarine emulsion in churn 111 is maintained at about 100° to 105° F. The liquid margarine is discharged from the bottom of the churn through a line 115 which joins with the suction of a pump 116 and is thereby pumped through chilling A-unit cylinders 117 and 118 and a working B-unit cylinder 119 before being further propelled by means of a booster pump 120 through a single chilling A-unit cylinder 121. The margarine leaves A-unit cylinder 121 through line 122 and an extrusion valve 123. The valve serves to maintain a pressure of 200 p.s.i.g.

The residence time in each A-unit cylinder is about 4 seconds while that in the working B-unit cylinder is about 96 seconds with a through-put rate of about 6000 pounds per hour. The superchilled liquid margarine product leaving the A-unit cylinder 118 is at a temperature of about 50° F., whereas it is about 56° F. leaving the working B-unit cylinder 119 and about 48° F. leaving the A-unit cylinder 121. The margarine, as a flowable mass, passes through line 124 and then through alternating valves 125 and 126 which function in conjunction with metering systems (not shown), each comprising a piston-cylinder combination. These provide alternate flow of margarine of the same volume as the final print through solidification and molding zones 127 and 128 which have the same cross-sectional area as the final print. Solidified margarine is discharged alternately from the molding zones 127 and 128 and passes to the recesses or mold cavities 130 and 131 of packaging units (not shown). The reciprocating action of the mold cavities cleaves the margarine to prints of desired size and these are ejected as prints 132 and 133. The prints are wrapped, carried on conveyor systems 134 and 135, and then packaged in accordance with conventional practices. The temperature of the product is about 53° F. The second increase in tempeaure is due to further dissipation of the titer heat resulting from fat crystallization, as the margarine sets up in the molding zone and in its wrapper. Part of the margarine in line 124 is recycled to the churn 111 to assure a sufficient amount for molding and packaging. The excess flowable mass of margarine is passed through a heat exchanger 136 before entering churn 111 through line 114. In the heat exchanger, the temperature is raised to about 100° F. thus assuring complete liquefaction of the recycled margarine. In the process described, about 81% of the potential titer heat of the superchilled liquid margarine is dissipated.

Figure 6:
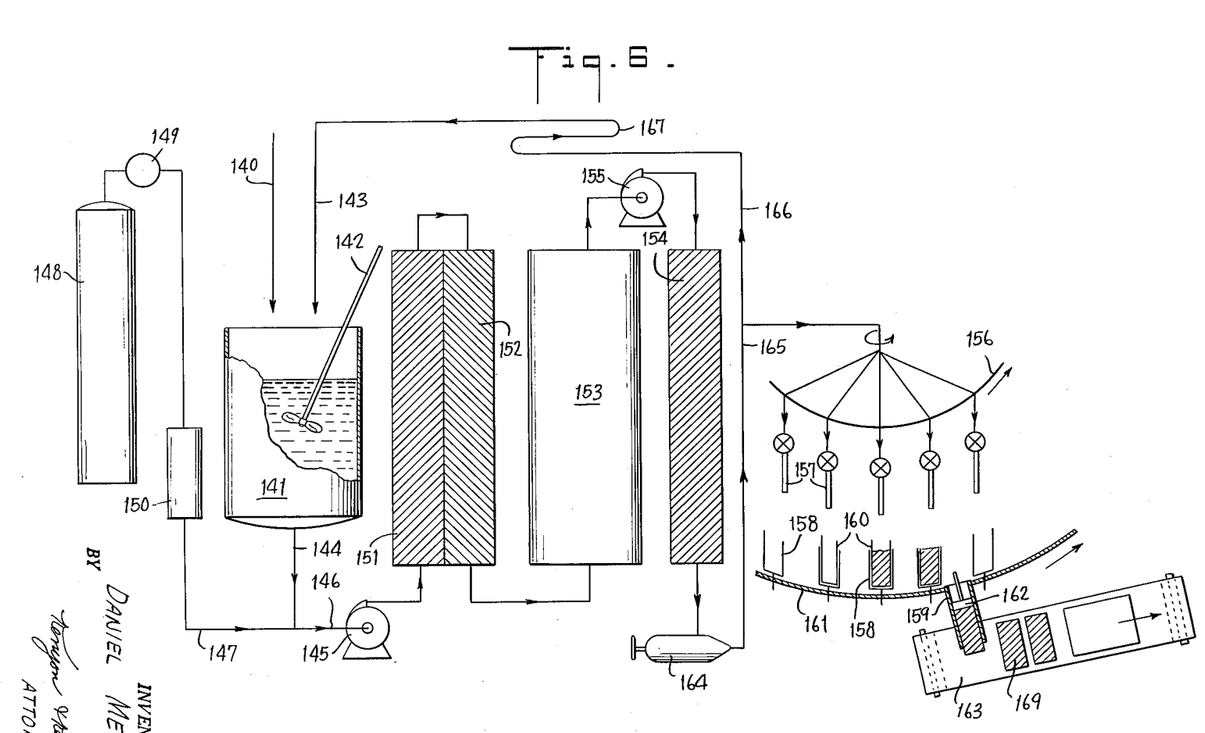
Figure 6 is a whipped margine production similar to the arrangement shown in Figure 4.

Referring to Figure 6, 80.4 parts by weight of margarine fat having a melting point of 94.3° F., a setting point of 74.0° F. and an iodine value of 86.0 and having dissolved therein the customary vitamins, emulsifiers and preservatives, are combined with 17.6 parts by weight of skim milk and 2.0 parts by weight of sodium chloride. The fat consists of 24 parts of soyabean oil selectively hydrogenated to an iodine value of 67.4, 56 parts of soyabean oil selectively hydrogenated to an iodine value of 92.8 and 20 parts of cottonseed oil selectively hydrogenated to an iodine value of 89.0. The margarine mixture is fed from a supply line 140 to a churn 141 in which is positioned a stirrer 142 for thoroughly mixing the same. Recycled margarine is also fed to the churn 141 by means of a recycle line 143. The temperature of the margarine emulsion in churn 141 is maintained at about 100 to 105° F. Liquid margarine is discharged from the bottom of the churn through a line 144 and enters a pump 145 through the suction line 146 of the pump. Nitrogen gas is fed from line 147 in a quantity as to provide a final product containing 33% by volume of added nitrogen. The nitrogen gas is supplied from a cylinder 148 and the flow is controlled by means of a control valve 149 and a gas-flow meter 150. The concentration of the nitrogen gas is controlled by periodic measurements of the specific volume of the end product before it is allowed to setup.

The aerated liquid margarine is pumped by pump 145 through two chilling A-unit cylinders 151 and 152, a working B-unit cylinder 153 and finally through another chilling A-unit cylinder 154 with the aid of a booster pump 155. The margarine as a flowable mass leaves the A-unit cylinder 154 through a line leading to an extrusion valve 164. The latter is adjusted to maintain a pressure of 50 pounds p.s.i.g. The residence time in each A-unit cylinder is about 4 seconds while that in the working B-unit cylinder is about 96 seconds, with a through-put rate of about 4000 pounds per hour. The superchilled liquid margarine product leaving the A-unit cylinder 152 is at a temperature of about 55° F., whereas it is about 58° F. leaving the working B-unit cylinder 153 and is about 48° F. leaving the chilling A-unit cyinder 154. The margarine, as a flowable mass, is fed from the valve 164 to line 165, then passes through a rotating spider shaped manifold 156 containing discharge spouts 157 which operate in conjunction with metering system (not shown), each comprising a piston-cylinder combination. The spouts feed the flowable mass into mold cavities 158 which are lined with a wrapper 160. The mold cavities are supported on a turntable 161 which is arranged to rotate in the same direction and at the same rate as the rotating manigold 156. As the mold cavity lined with wrapper is being filled, the pressure on the margarine is immediately reduced to atmospheric level. At the required volume, the upright flaps of the wrapper are folded back on the print, and as shown for the product in mold cavity 159, the wrapped print is then ejected by a piston 162. The piston 162 serves as the bottom of the mold cavity and can be moved in an up and down manner as illustrated. After the print is ejected, it is placed on a conveyor belt 163 and cartoned. The wrapped product solidifies within a matter of seconds, while it is within the mold cavity. The wrapped print 169 is now at a temperature of about 53° F., the second increase in temperature being due to further dissipation of the titer heat resulting from fat crystallization occurring as the margarine sets up in the molding zone and in its wrapper.

The feed line 165 to the rotating manifold divides such that a portion of margarine is recycled to churn 141 by means of line 166. This line provides recycling of excess margarine, the excess being produced to assure at all times sufficient output for molding and packaging. The excess aerated flowable mass is recycled through a heat exchanger 167 before entering churn 141 through line 143. In the heat exchanger the temperature is raised to about 100° F. thus assuring complete liquefaction of the returned margarine. In the process described, about 81% of the potential titer heat of the superchilled liquid margarine is dissipated.

Having thus provided a description of my invention along with specific examples, it should be understood that it is defined by the appended claims.

I claim:

1. A process for producing a margarine product substantially free from occluded gas which comprises superchilling a liquid margarine to a temperature of about 15° to 40° F. below the setting point of the fat ingredient thereof, working the superchilled liquid margarine to dissipate at least about 20% of the potential titer heat due to fat crystallization but maintaining the margarine as a flowable mass, and packaging the margarine, the fat ingredient having a Wiley melting point of about 90° to 100° F., a setting point of about 70° to 80° F. and an iodine value of about 70 to 90, and said process being operated such that no work is imparted to the solidified margarine.

2. The process of claim 1 wherein the flowable mass is solidified into a rectangular shaped print and the resultant print is wrapped.

3. A process for producing a margarine product substantially free from occluded gas which comprises superchilling a liquid margarine to a temperature of about 15° to 40° F. below the setting point of the fat ingredient thereof, working the superchilled liquid mass until the same undergoes a temperature rise of about 6 to 30° F. and about 20 to 40% of the potential titer heat is dissipated due to fat crystallization but maintaining the margarine as a flowable mass, and packaging the margarine, the fat ingredient having a Wiley melting point of about 90° to 100° F., a setting point of about 70° to 80° F. and an iodine value of about 70 to 90, and said process being operated such that no work is imparted to the solidified margarine.

4. A process for producing a margarine product substantially free from occluded gas which comprises superchilling a liquid margarine to a temperature of about 35° to 63° F., working the superchilled liquid margarine until the temperature thereof rises to about 50° to 73° F. and about 20 to 40% of the potential titer heat due to fat crystallization is dissipated but maintaining the margarine as a flowable mass, and packaging the margarine, the fat ingredient having a Wiley melting point of about 90° to 100° F., a setting point of about 70° to 80° F. and an iodine value of about 70 to 90, and said process being operated such that no work is imparted to the solidified margarine.

5. A process for producing a margarine product substantially free from occluded gas which comprises superchilling a liquid margarine to a temperature of about 15° to 40° F. below the setting point of the fat ingredient thereof, working the superchilled liquid margarine until the temperature thereof increases about 2° to 15° F., superchilling the worked flowable mass to a temperature of about 15° to 40° F. below the setting point of the fat ingredient thereof, and packaging the margarine as a flowable mass, in said process about 30 to 90% of the potential titer heat due to fat crystallization being dissipated, the fat ingredient having a Wiley melting point of about 90° to 100° F., a setting point of about 70° to 80° F. and an iodine value of about 70 to 90, and said process being operated such that no work is imparted to the solidified margarine.

6. A process for producing a margarine product substantially free from occluded gas which comprises superchilling a liquid margarine containing a fat ingredient to a temperature of about 35° to 63° F., working the superchilled liquid margarine until a temperature of about 50° to 65° F. is attained, superchilling the worked flowable mass to a temperature of about 35° to 63° F., and packaging the margarine as a flowable mass to produce a solidified product with a temperature of about 43° to 65° F., in said process about 30 to 90% of the potential titer heat due to fat crystallization being dissipated, the fat ingredient having a Wiley melting point of about 90° to 100° F., a setting point of about 70° to 80° F. and an iodine value of about 70 to 90, and said process being operated such that no work is imparted to the solidified margarine.

7. The process of claim 5 wherein the flowable mass is solidified into a rectangular shaped print and the resultant print is wrapped.

8. A process for producing a margarine product substantially free from occluded gas which comprises superchilling the total liquid margarine to a temperature of about 15° to 40° F. below the setting point of the fat ingredient thereof, working the superchilled liquid margarine to dissipate at least about 20% of the potential titer heat due to fat crystallization but maintaining the margarine as a flowable mass, and packaging the margarine, the fat ingredient having a Wiley melting point of about 90° to 100° F., a setting point of about 70° to 80° F. and an iodine value of about 70 to 90, and said process being operated such that no work is imparted to the solidified margarine.

9. A process for producing a margarine product substantially free from occluded gas which comprises superchilling the total liquid margarine to a temperature of about 15° to 40° F. below the setting point of the fat ingredient thereof, working the superchilled liquid margarine until the temperature thereof increases about 2° to 15° F., superchilling the worked flowable mass to a temperature of about 15° to 40° F. below the setting point of the fat ingredient thereof, and packaging the margarine as a flowable mass, in said process about 30 to 90% of the potential titer heat due to fat crystallization being dissipated, the fat ingredient having a Wiley melting point of about 90° to 100° F., a setting point of about 70° to 80° F. and an iodine value of about 70 to 90, and said process being operated such that no work is imparted to the solidified margarine.

10. A process for producing a margarine product substantially free from occluded gas which comprises superchilling a liquid margarine to a temperature of about 15° to 40° F. below the setting point of the fat ingredient thereof, working the superchilled liquid margarine to dissipate at least about 20% of the potential titer heat due to fat crystallization but maintaining the margarine as a flowable mass, packaging the margarine and immediately refrigerating said packaged margarine, the fat ingredient having a Wiley melting point of about 90° to 100° F., a setting point of about 70° to 80° F. and an iodine value of about 70 to 90, and said process being operated such that no work is imparted to the solidified margarine.

11. A process for producing a margarine product substantially free from occluded gas which comprises superchilling a liquid margarine to a temperature of about 15° to 40° F. below the setting point of the fat ingredient thereof, working the superchilled liquid margarine until the temperature thereof increases about 2° to 15° F., superchilling the worked flowable mass to a temperature of about 15° to 40° F. below the setting point of the fat ingredient thereof, packaging the margarine as a flowable mass and immediately refrigerating said packaged margarine, in said process about 30 to 90% of the potential titer heat due to fat crystallization being dissipated, the fat ingredient having a Wiley melting point of about 90° to 100° F., a setting point of about 70° to 80° F. and an iodine value of about 70 to 90, and said process being operated such that no work is imparted to the solidified margarine.

12. A process for producing a margarine product substantially free from occluded gas which comprises superchilling the total liquid margarine to a temperature of about 15° to 40° F. below the setting point of the fat ingredient thereof, working the superchilled liquid margarine to dissipate at least about 20% of the potential titer heat due to fat crystallization but maintaining the margarine as a flowable mass, packaging the margarine and immediately refrigerating said packaged margarine, the fat ingredient having a Wiley melting point of about 90° to 100° F., a setting point of about 70° to 80° F. and an iodine value of about 70 to 90, and said process being operated such that no work is imparted to the solidified margarine.

13. A process for producing a margarine product substantially free from occluded gas which comprises superchilling the total liquid margarine to a temperature of about 15° to 40° F. below the setting point of the fat ingredient thereof, working the superchilled liquid margarine until the temperature thereof increases about 2° to 15° F., superchilling the worked flowable mass to a temperature of about 15° to 40° F. below the setting point of the fat ingredient thereof, packaging the margarine as a flowable mass and immediately refrigerating said packaged margarine, in said process about 30 to 90% of the potential titer heat due to fat crystallization being dissipated, the fat ingredient having a Wiley melting point of about 90° to 100° F., a setting point of about 70° to 80° F. and an iodine value of about 70 to 90, and said process being operated such that no work is imparted to the solidified margarine.

References Cited in the file of this patent

UNITED STATES PATENTS

| | | |
|---|---|---|
| 2,047,530 | Vahlteich et al. | July 14, 1936 |
| 2,098,010 | Newton et al. | Nov. 2, 1937 |
| 2,167,113 | Haurand et al. | July 5, 1939 |
| 2,330,986 | Miller et al. | Oct. 5, 1943 |
| 2,772,976 | Schmidt et al. | Dec. 4, 1956 |
| 2,797,164 | McGowan et al. | June 25, 1957 |